United States Patent [19]

Abbott

[11] E Re. 30,489

[45] Reissued Jan. 20, 1981

[54] LONGITUDINAL LOAD CARRYING METHOD FOR FIBER REINFORCED FILAMENT WOUND STRUCTURES

[75] Inventor: Harry T. Abbott, Lincoln, Nebr.

[73] Assignee: Brunswick Corporation, Skokie, Ill.

[21] Appl. No.: 59,728

[22] Filed: Jul. 23, 1979

Related U.S. Patent Documents

Reissue of:

[64] Patent No.: 4,118,262
Issued: Oct. 3, 1978
Appl. No.: 688,746
Filed: May 21, 1976

[51] Int. Cl.[3] ..... B65H 81/00

[52] U.S. Cl. ..... 156/175; 60/200 A; 138/DIG. 2; 156/425; 220/1 B; 220/DIG. 23; 242/721

[58] Field of Search ..... 156/175, 173, 172, 170, 156/425; 60/200 A; 242/7.02, 7.21, 7.22; 220/3, 83, 71, 72, DIG. 23, 1 B

[56] References Cited

U.S. PATENT DOCUMENTS

| | | | |
|---|---|---|---|
| 2,995,175 | 8/1961 | Lundskow | 156/175 |
| 3,021,241 | 2/1962 | Schneiderman et al. | 156/175 |
| 3,083,864 | 4/1963 | Young | 60/200 A |
| 3,577,294 | 5/1971 | David | 156/173 |
| 3,765,980 | 10/1973 | Hurlbut | 156/175 |
| 3,866,792 | 2/1975 | Minke | 156/175 |

*Primary Examiner*—Michael W. Ball
*Attorney, Agent, or Firm*—George J. Porter

[57] ABSTRACT

A lightweight composite fiber wound tubular member or casing, such as a rocket motor case, has one or more openings formed through one end portion of the wall thereof by orienting the filaments or fibers around each opening to provide reinforcement for loads applied to fasteners passing through said openings. The orientation of the filaments or fibers is such as to receive and transfer loads applied to the walls of the openings in the tubular member in a direction substantially parallel to the axis of the tubular member. A method of manufacturing the tubular member is disclosed which includes winding the filaments or fibers along a helical path and around the area defining each opening, together with the apparatus for performing the method.

20 Claims, 8 Drawing Figures

FIG. 4
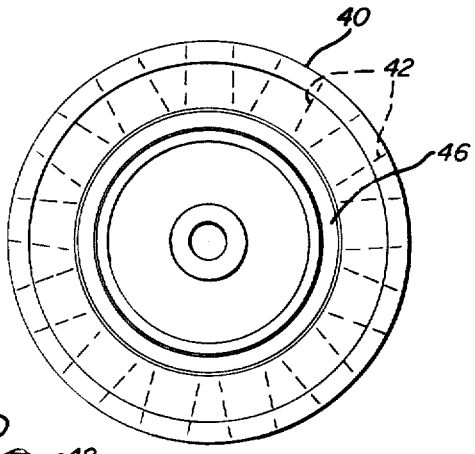
FIG. 5
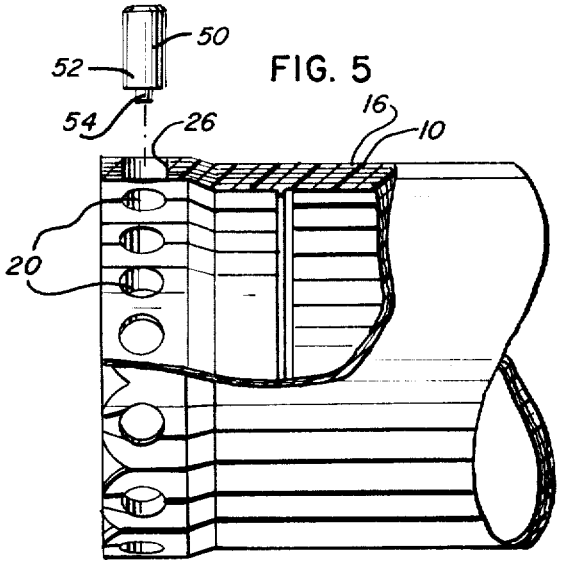
FIG. 6
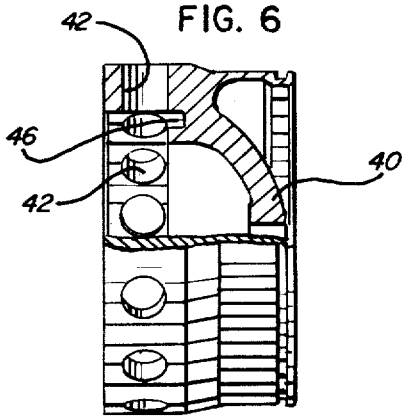
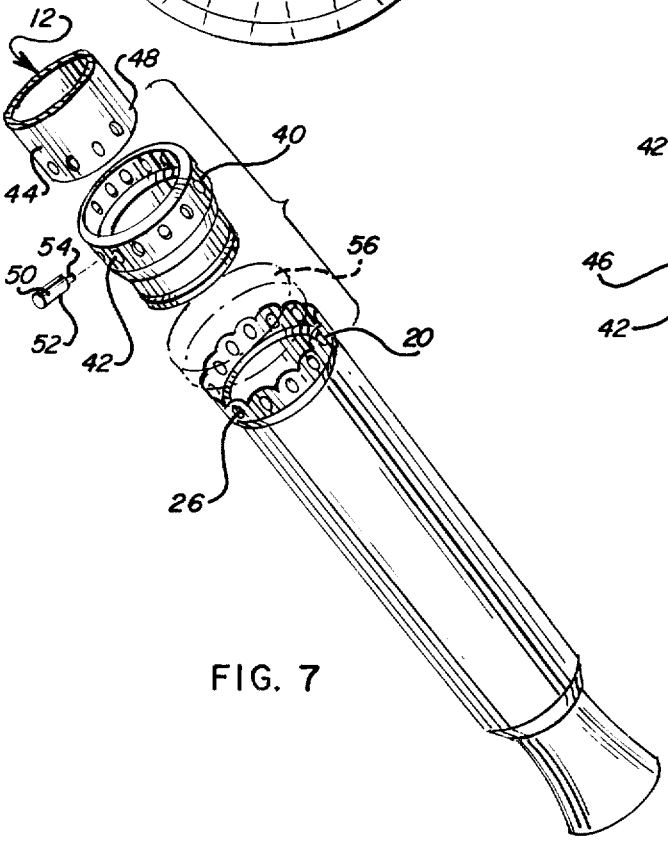
FIG. 7
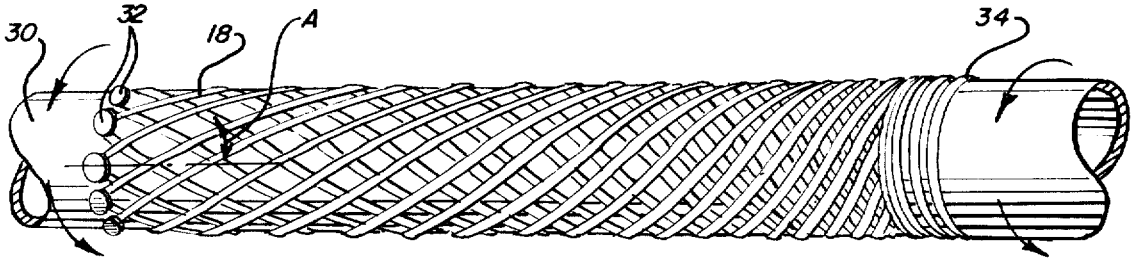
FIG. 8

LONGITUDINAL LOAD CARRYING METHOD FOR FIBER REINFORCED FILAMENT WOUND STRUCTURES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to lightweight composite fiber or filament wound tubular members and, more particularly, to tubular members having continuous fibers or filaments wound around an area to define an opening in the side of the tubular member so as to orient such fibers around the opening so that the fasteners which pass through these openings apply loads which can be carried in tension by the continuous fibers and a method and apparatus for manufacturing such tubular members.

2. Description of the Prior Art

Fiber or filament wound pressure vessels, casings or tubular members have been known and used for several years and are in particular demand because of their lightweight, high strength characteristics. In using the casings or tubular members with other items, such as with a nozzle of a rocket, or any other type of end closure, it is necessary to attach the casing to the metal end of the item. Several attaching methods have been tried, such as drilling a plurality of openings through the one end portion of the wall of the casing through which pins or bolts were passed for attachment to the metal end of the nozzle. This attachment failed, due to the failure of the resin system used to bond the fibers to one another. The resin bond of fiber to fiber is not capable of carrying large loads therefore the pins or bolts were pulled out through this relatively weak fiber reinforced resin.

Another method of attaching a casing to a metal tube or to another casing is to provide interior or exterior threads on the casing which are threaded to a sleeve or collar on the tube or other casing. These forms of attachment, likewise, failed before the desired loads could be transferred from the one casing to the other.

Still another known method of attachment provided for forming a continuous recess in the casing near one end thereof into which a flange on a connector projecting from a tube seats and is clamped therein by a split ring clamp. This attachment also failed to meet the required transfer of loads from one casing to another.

A further method of reinforcing the wall of a fiber wound pressure vessel in the vicinity of an opening drilled therethrough is to place between each layer of fiber a ring of concentrically wound fiber with the openings in each ring aligned so that the fiber wound vessel can be drilled in line with the openings in the rings. The resulting vessel has better pressure rupturing capacity, but it is still far short of that desired.

SUMMARY OF THE INVENTION

I have discovered that by winding the resin coated or impregnated fibers around a mandrel and around pegs on the mandrel, which pegs define the size and location of one or more desired openings in the wall of the casing, a tubular member or casing can be produced having the walls of the openings therethrough that will not pull out or shear from the body of the vessel. It is known that fiber wound casings have in the past had junctions or attachments such that the load transfer was in the shear mode and, when holes were drilled in the walls of the casings, the shear strength of the fiber/resin composite was relatively low resulting in the junctions or attachments failing under load.

My improved apparatus and the method of manufacturing casings on said apparatus, produces casings that have continuous fibers laid up in a pattern to produce a structure whereby forces applied to a part of the casing are transferred substantially along the length of the fibers resulting in stronger and better casings. That is, as the fibers are wound in a helical pattern around a mandrel and as the fibers approach each peg defining an opening, the angle between the axis of the fiber and the longitudinal axis of the casing is kept as small as possible so that forces applied to the fibers will be substantially longitudinal tensile forces. In this way, the completed casing has the plural layers of fibers wrapped continuously around the one side of the holes in the casing and extend substantially longitudinally with respect to the axis of the casing so that fasteners through the openings and connected to a tube or another casing can transmit high loads without pulling out the walls of the openings in the casing.

Therefore, this invention provides an efficient method for transferring forces in a direction parallel to the axis of the casing by means of the fibers forming one wall of an opening in the casing receiving the forces and transferring said forces into said tubular structure. A method for orienting the fibers at or near the open end of a tubular casing is disclosed which orientation can be accomplished by using a filament winding method that produces a casing having a series of holes around the circumference of the part with the walls of said holes being capable of receiving and transferring large magnitudes of forces from the mating hardware into the casing. A very high percentage of structural properties of a filament wound casing is as a result of the strength of the reinforcing fibers, which are only structurally efficient when carrying a tensile load. The invention provides for the continuous reinforcing fiber being oriented to pass around the periphery of each of the holes at or near the open end of the tube. These holes then provide a means whereby another piece of mating structure can be attached by a pin or bolt through the hole and any load transfer between the tube and the mating structure will be transferred through the pin directly into the reinforcing fibers which are wrapped around the hole so the fibers may carry the transferred load in a direct tensile mode.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 4 is an end view looking at the left end of FIG. 6;

FIG. 5 is a partial view of a casing having a portion broken away and with a pin aligned with one of the openings;

FIG. 6 is an elevational view, partially broken away, of an insert for use in the end of FIG. 5;

FIG. 7 is an exploded perspective view of the casing, insert and one pin according to my invention; and FIG. 8 is an apparatus for winding the reinforcing fibers to arrive at a structure of a tubular casing having holes formed around the circumference of one end thereof.

DESCRIPTION OF THE PREFERRED EMBODIMENT

Figure 1:
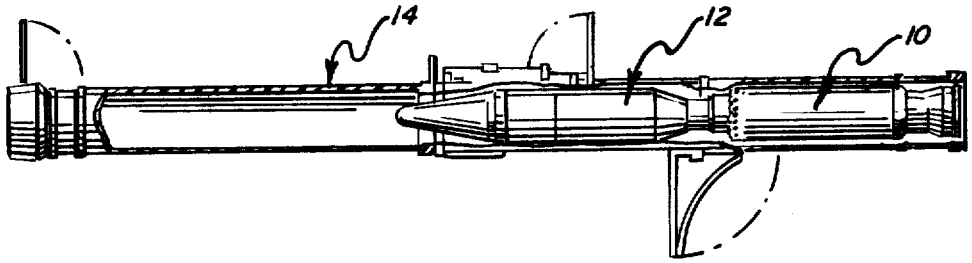
FIG. 1 shows a bazooka-like apparatus containing a projectile which has a casing attached thereto according to my invention.
Figure 2:
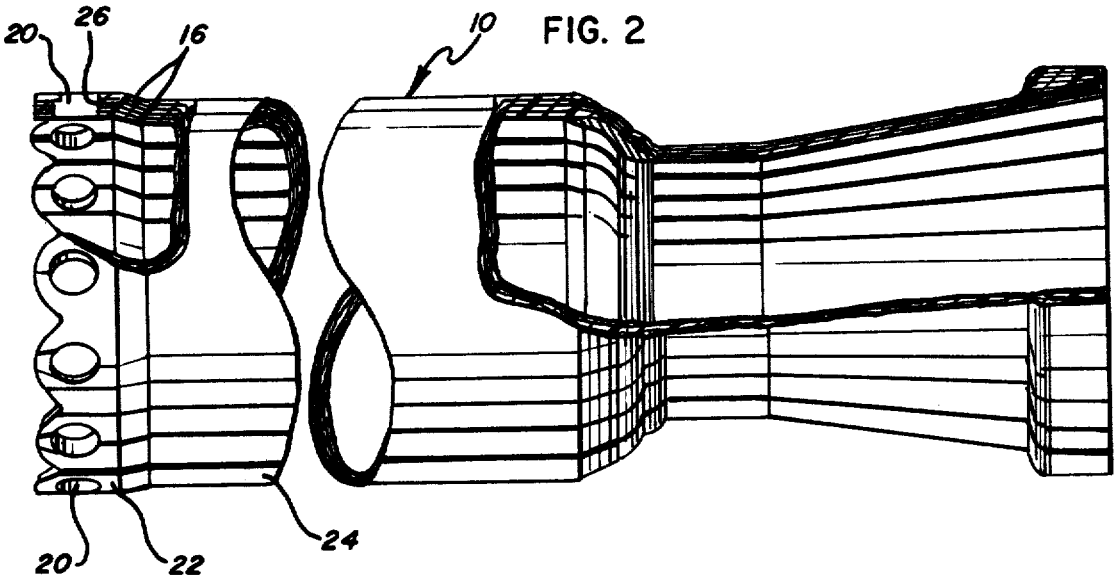
FIG. 2 is an enlarged, partially broken away and sectioned, casing or tubular member made according to my invention.
Figure 3:
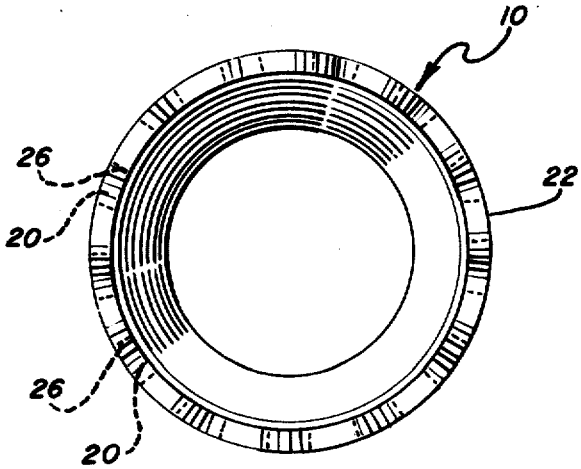
FIG. 3 is an end view looking at the left end of FIG. 2.

In a preferred embodiment of the invention, a fiber wound casing 10, made according to my invention, is shown in FIG. 1 attached to a warhead 12 which is illustrated as positioned in a launch tube 14. The fiber wound tubular casing 10 is comprised of a plurality of layers 16 of reinforcing resin impregnated fiber material 18 which is continuously wrapped or wound in layers around a mandrel until the desired thickness is obtained. The casing 10 is then processed so that a lightweight tubular member of high strength characteristics is produced.

In order to attach the tubular casing 10 to a warhead 12 or to another tubular casing, it has been found that a plurality of openings 20 must be formed through the wall 22 of the casing near one end portion 24 of said casing 10. Each reinforcing fiber 18 used to build up the requisite thickness and strength of the cylindrical wall of the casing, is composed of glass, graphite, metal, carbon, boron, Kelvar (a trademark of DuPont Company) or other synthetic materials. The fibers are coated or impregnated with resin which may be a thermoplastic resin or a thermosetting resin. Typical resins for coating or impregnating said fiber would be epoxy, polyester, melamine or the like.

A cylindrical mandrel 30, such as shown in FIG. 8, is provided with an appropriate number of pegs 32 formed in a ring around the outer circumference of the cylindrical mandrel 30. The pegs 32 are equally spaced apart a predetermined distance. Each peg 32 will define the space for one opening 20 that is desired to be formed through the wall 22 of the tubular casing 10. The cylindrical mandrel 30 is rotated and moved or shifted axially in a programmed manner so that a filament or fiber 18, which is initially held against the mandrel 30 at a location 34, will follow a helical path along the surface of the tubular member 30 with the angle "A" of the helix decreasing as it approaches one of the pegs 32 projecting from the mandrel 30. The filament of fiber 18 is passed around one of the pegs 32 and is drawn in the reverse direction around the mandrel 30 to follow a helical path of gradually increasing angle until the point 34 is reached, whereupon the direction of the fiber 18 is again reversed. The resin impregnated fiber 18 is wrapped back and forth around the mandrel 30 each time passing around one other peg, preferably the next peg adjacent to the previously circled peg. After one complete layer 16 of filaments or fibers 18 has been laid up, another layer is commenced which will have a slightly different helical angle "A" as it approaches the pegs 32 so that it will approach the pegs 32 at a slightly increased angle with respect to the longitudinal axis of the tubular member. After the requisite number of layers 16 of filaments or fibers 18 have been laid up on the cylindrical member, the multilayered fibers are cured or set. The pegs 32 are then removed from the mandrel 30 whereupon the mandrel is stripped from within the lightweight fiber wound tubular member or casing 10. The casing 10 will have a predetermined, equally spaced apart number of openings 20 formed in a ring around one end portion 24 of the casing 10. Each fiber 18 forming the layers 16 of fibers in the casing 10 will be continuous and will wrap around and form one wall 26 of each of the openings 20 through the one end portion of the casing 10.

In winding the filaments or fibers 18, such as shown in FIG. 8, it has been found that even though the smallest possible angle "A" between the fiber or filament and the centerline of the tubular member or casing 10 is desirable, the angle is limited. Also, it has been found desirable that the angle "A" varies from layer-to-layer, so that the thickness of the build up of fiber material between the pegs 32 and the end of the tubular member or casing will not become excessive. In one operative example, the angle "A" between the fiber and the axis of the mandrel 30 was varied from approximately 27° to approximately 47°. The fibers 18 passing around each peg 32 spread out from layer-to-layer thereby producing a functional and operative structure around each peg 32 and, ultimately, produced the load bearing wall of each opening through the wall 22 of the tubular member or casing 10. Each successive layer of filament winding approaches each peg at an angle slightly greater than the angle of the previous filament layer until the angle is a predetermined maximum. Thereafter, each layer of filaments is laid up with a smaller angle than the previous layer has formed until a predetermined minimum angle is reached.

An insert 40, such as shown in FIG. 6, is shaped to fit within the open end of the tubular member or casing 10 and has a circumferential series of equally spaced apart openings 42 which are adapted to align with the openings 20 in the end of the tubular member or casing 10. The warhead 12, of a rocket or the tail portion 44 of same, is fit into the recessed slot 46 formed in the inside of the insert 40 with a plurality of smaller diametered, aligned openings 48 formed therethrough and positioned to align with the openings 42 in the insert and the openings 20 in the tubular casing 10. A requisite number of pins 50 having step-down diameters are provided with the larger diameter portion 52 nesting in the openings 20 in the tubular member or casing 10 and openings 42 in the insert 40 with the step-down smaller diameter portion 54 fitting into the opening 48 in the end portion of the tail portion 44 of the warhead 12. An encasing sleeve 56 is fit around the outer periphery of the end portion 24 of the tubular member or casing 10 and bears against the end portions of the pins 50 so as to hold the pins assembled in the tubular member or casing 10 in the insert 40 and in the tail portion 44 of the warhead 12. In this way, a solid, substantially fail proof connection between the lightweight tubular member or casing 10 and the warhead 12 is provided.

It has been found that the fiber glass resin wound tubular member or casing is much stronger for the weight of the member and is less expensive to manufacture. As for aging, only metal is more age resistant, but metal is more expensive, more difficult to machine and is heavier. Aeroballistics requires light weight, therefore, fiber wound tubular members are the only members capable of maintaining the requisite gas pressure within the weight limits and, my improved fiber wound tubular members with attachment openings are the only members that are capable of withstanding the requisite longitudinal loads. A number of different types of tubes have been made up and have been tested for the amount of force capable of being transmitted through the attachment section of one fiber wound tubular member to another fiber wound tubular member or to a metal member. The following is a tabulation of the results:

(1) For integrally wound holes according to the present invention:

F equaled approximately 25,000 pounds.

(2) For bonded structures: assuming an average bond strength of 2,000 psi in a joint length of 1 inch, F equaled 14,000 pounds.

(3) For integrally threaded structure: assuming 3,000 psi for 0.75 inch length along axis, F equaled 16,000 pounds.

(4) For drilled holes: it was only possible to estimate the loading which appeared to be approximately one-half the load of the integrally wound holes or F equaled approximately 12,000 pounds.

In summary, the forces transmitted using bonded structures, integral threaded structures and drilled holes of approximately 14,000, 16,000 and 12,500 are not considered sufficient for a reliable joint. The loading for the joint using my improved integrally wound hole structure of 25,000 pounds is considered to be a highly reliable joint.

Although the attachment of the tubular member with the warhead of a rocket has been shown and described hereinabove, it should be recognized that the present invention is capable of use in many different areas. For instance, when fiber wound tubular members or casings made according to my invention are connected together, a highly reliable joint is produced that is capable of transmitting extreme loads from one casing to the other without failure of the fiber material that is being used to make up the area between the wall of the opening and the end wall of the casing.

I claim:

1. In a method of manufacturing a lightweight filament wound casing having connector openings at one end comprising the steps of:

(1) preparing a cylindrical mandrel by inserting a predetermined number of radially projecting, spaced-apart pegs near one end portion thereof, (2) rotating said mandrel as it is moved longitudinally in one direction, (3) feeding a continuous resin impregnated filament to the surface of said mandrel to lay the filament up in a helical form, (4) controlling the speed of the longitudinal movement so as to decrease the angle the filament makes with respect to the longitudinal axis of the mandrel as the fiber approaches the area of the pegs and increase the angle as the filament leaves the area of the pegs, said filament being passed around one of said pegs as the direction of longitudinal movement is reversed, the filament being laid up along a helical path around the mandrel back to a starting point, each layer of filaments including at least one pass around each peg in said mandrel;

(5) curing the wound casing, (6) removing the pegs from the mandrel; and, (7) removing the casing from the mandrel.

2. In the method of manufacture of claim 1 wherein the longitudinal movement of the mandrel is such as to produce an angle between the filament and the axis of the mandrel of 27°.

3. In the method of manufacture of claim 1 wherein the longitudinal movement of the mandrel is such as to produce an angle between the filament and the axis of the mandrel varying from 27° to 47°.

4. In the method of manufacture of claim 1 wherein the longitudinal movement of the mandrel is such that each filament of the first layer of filaments will have an angle of approximately 27° with respect to the longitudinal axis of the mandrel, each filament of each successive layer of filaments having a slightly increased angle with respect to the longitudinal axis until a maximum angle of approximately 47° is reached.

5. In a method of manufacturing a lightweight filament wound casing having connector openings at one end comprising the steps of:

(1) preparing a cylindrical mandrel by inserting a predetermined number of radially projecting, circumferentially equally spaced-apart pegs therein, (2) rotating said mandrel as it is moved longitudinally first in one direction and then in reverse, (3) connecting a continuous resin coated filament to said mandrel, said rotating and longitudinal movement of the mandrel will lay the filament up in a helical path so that the angle of the filament to the longitudinal axis of the mandrel is relatively small as the filament approaches one of said pegs, (4) controlling the speed of the longitudinal movement so as to decrease the angle the filament makes with respect to the longitudinal axis of the mandrel as the filament approaches the area of the pegs and increases the angle as the filament leaves the area of the pegs and, said filament being passed around said peg as said longitudinal movement of the mandrel is reversed, the filament being laid up along a helical path around the mandrel back to a starting point, each layer of filaments including at least one pass around each peg in said mandrel, (5) wrapping said filament along a helical path around the mandrel back toward the area where the winding was initially started, each layer of filaments including at least one pass around each peg in said mandrel, each successive layer of filaments having the filaments approach each peg at an angle slightly greater than the angle of the previous layer until said angle is a predetermined maximum, thereafter each layer of filaments is laid up with a smaller angle than the previous layer until a predetermined minimum angle is reached, (6) curing the wound casing, (7) removing the pegs and then casing from the mandrel.

6. In a method of manufacturing as claimed in claim 5 wherein said maximum angle is approximately 47° and said minimum angle is approximately 27°.

*7. In a method of manufacturing a lightweight filament wound casing having connector openings in at least one end comprising the steps of:*

*(1) preparing a casing core having an axis by inserting a predetermined number of projecting pegs spaced apart about said axis near an end portion of said core to form said connector openings;*

*(2) rotating said core about said axis as said core is moved in one direction substantially parallel to said axis;*

(3) feeding a continuous resin impregnated filament to the surface of said core to lay the filament up in a helical form at an angle with respect to said axis;

(4) controlling the speed of the movement of the core so as to decrease the angle the filament makes with respect to said axis of the core as the fiber approaches the area of the pegs and increase the angle as the filament leaves the area of the pegs, said filament being passed around one of said pegs as the direction of the movement of the core relative to its axis is reversed, the filament being laid up along a helical path around the core back to a starting point, each layer of filament including at least one pass around each peg in said core to orient said filaments in a formed and cured casing so as to receive and transfer loads applied to the walls of said openings in a direction substantially parallel to said axis;

(5) curing the wound casing;

(6) removing the pegs from the core; and (7) removing the casing from the core.

8. In the method of manufacture of claim 7 wherein the movement of the core is such as to produce an angle between the filament and the axis of the core of 27°.

9. In the method of manufacture of claim 7 wherein the movement of the core is such as to produce an angle between the filament and the axis of the core varying from 27° to 47°.

10. In the method of manufacture of claim 7 wherein the movement of the core is such that each filament of the first layer of filaments will have an angle of approximately 27° with respect to the axis of the core, each filament of each successive layer of filaments having a slightly increased angle with respect to the axis until a maximum angle of approximately 47° is reached.

11. In a method of manufacturing a lightweight filament wound casing having connector openings in at least one end comprising the steps of:

(1) preparing a casing core having an axis by inserting a predetermined number of projecting pegs spaced equally about said axis in said core;

(2) rotating said core about said axis as said core is moved first in one direction relative to its axis and then in the opposite direction;

(3) connecting a continuous resin coated filament to said core, said rotation and movement of the core laying the filament up in a helical path at an angle with respect to said axis of the core so that the angle is relatively small as the filament approaches one of said pegs;

(4) controlling the speed of the movement of the core so as to decrease the angle the filament makes with respect to the axis of the core as the filament approaches the area of the pegs and increase the angle as the filament leaves the area of the pegs, said filament being passed around one of said pegs as the direction of the movement of the core relative to its axis is reversed;

(5) wrapping said filament along a helical path around the core back toward the area where the winding was initially started, each layer of filaments including at least one pass around each peg in said core, each successive layer of filaments having the filaments approach each peg at an angle relative to said axis of the core slightly greater than the angle of the previous layer until said angle is a predetermined maximum, thereafter each layer of filaments being laid up with a smaller angle than the previous layer until a predetermined minimum angle is reached to thereby orient said filaments to receive and transfer loads applied to the walls of said openings in a direction substantially parallel to said axis in a fully formed and cured casing;

(6) curing the wound casing; and (7) removing the pegs and then the casing from the core.

12. In a method of manufacturing as claimed in claim 11 wherein said maximum angle is approximately 47° and said minimum angle is approximately 27°.

13. In a method of manufacturing a lightweight filament wound casing having connector openings in at least one end comprising the steps of:

(1) preparing a mandrel having an axis by inserting a predetermined number of projecting pegs spaced about said axis near one said portion of said mandrel to form said connector openings;

(2) feeding a continuous resin impregnated filament to lay the filament up in a helical form at an angle with respect to said axis of the core beginning at a starting point on said mandrel and progressing in the direction of said axis toward said pegs;

(3) decreasing the angle said filament makes with respect to said axis as said filament approaches said pegs and increasing the angle said filament makes with respect to said axis as said filament leaves said pegs, said filament being passed around one of said pegs and the direction of relative movement between said filament and said mandrel in relation to the axis of the core being reversed so that said filament is laid up along a helical path around said mandrel back to said starting point to form said wound casing and to orient said filaments so as to receive and transfer loads applied to the walls of said openings in a direction substantially parallel to said axis in a formed and cured casing;

(4) curing said wound casing on said mandrel;

(5) removing said pegs from said mandrel; and (6) removing said wound casing from said mandrel.

14. The method of manufacture as defined in claim 13 wherein the movement of the mandrel is such as to produce an angle between the filament and the axis of the mandrel of 27°.

15. The method of manufacture as defined in claim 13 wherein the movement of the mandrel is such as to produce an angle between the filament and the axis of the mandrel varying from 27° to 47°.

16. The method of manufacture as defined in claim 13 wherein the movement of the mandrel is such that each filament of the first layer of filaments will have an angle of approximately 27° with respect to the axis of the mandrel, each filament of each successive layer of filaments having a slightly increased angle with respect to the axis of the mandrel until a maximum angle of approximately 47° is reached.

17. The method of manufacture as defined in claim 13 wherein said axis of said mandrel is the longitudinal axis thereof and wherein said filament and said mandrel undergo relative longitudinal movement.

18. In a method of manufacturing a lightweight filament wound casing having connector openings in at least one end comprising the steps of:

(1) preparing a casing core having an axis by inserting at least one projecting peg near one end portion thereof to form a connector opening;

(2) feeding a continuous resin impregnated filament to the surface of said core to lay the filament up in a helical form at an angle with respect to said axis of the core beginning at a starting point on said core and

*progressing in the direction of said axis toward said peg;*

*(3) decreasing the angle said filament makes with respect to said axis as said filament approaches said peg and increasing the angle said filament makes with respect to said axis as said filament leaves said peg, said filament being passed around said peg and the direction of relative movement between said filament and said core in relation to said axis of the core being reversed so that said filament is laid up along a helical path around said core back to said starting point to form said wound casing and to orient said filament so as to receive and transfer loads applied to the wall of said opening in a direction substantially parallel to said axis in a formed and cured casing;*

*(4) curing said wound casing on said core;*

*(5) removing said peg from said core; and*

*(6) removing said wound casing from said core.*

*19. The method of manufacturing as defined in claim 18 wherein the relative movement between said filament and said core is such as to produce an angle between said filament and said axis of said core varying between a maximum angle of approximately 47° and a minimum angle of approximately 27°.*

*20. The method of manufacturing as defined in claim 18 wherein said axis of said core is the longitudinal axis thereof and wherein said filament and said core undergo relative longitudinal movement.*

* * * * *